US006327129B1

(12) United States Patent
Oertel et al.

(10) Patent No.: US 6,327,129 B1
(45) Date of Patent: Dec. 4, 2001

(54) MULTI-STAGE SURGE PROTECTOR WITH SWITCH-GRADE FAIL-SHORT MECHANISM

(75) Inventors: H. Wolfgang Oertel; David Martin, both of Goleta, CA (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 09/483,149

(22) Filed: Jan. 14, 2000

(51) Int. Cl.[7] .................................................. H02H 1/00

(52) U.S. Cl. ......................... 361/118; 361/117; 361/120; 361/124

(58) Field of Search .................................. 361/118, 119, 361/120, 124, 127, 129, 56, 111, 117, 126, 128, 91.1; 439/810, 811, 812, 813, 814

(56) References Cited

U.S. PATENT DOCUMENTS

| | | | |
|---|---|---|---|
| 3,703,665 | 11/1972 | Yereance et al. | 317/61 |
| 3,863,111 | 1/1975 | Martzloff | 317/61.5 |
| 3,905,006 | 9/1975 | Matsuoka et al. | 338/21 |
| 4,023,071 | 5/1977 | Fussell | 361/56 |
| 4,099,217 | 7/1978 | Fitchew | 361/56 |
| 4,158,869 | 6/1979 | Gilberts | 361/118 |
| 4,188,561 | 2/1980 | Pranke et al. | 313/325 |
| 4,199,736 | 4/1980 | McTaggart et al. | 333/17 L |
| 4,208,694 | 6/1980 | Gilberts | 361/119 |
| 4,241,374 | 12/1980 | Gilberts | 361/124 |
| 4,249,224 | 2/1981 | Baumbach | 361/124 |
| 4,288,833 | 9/1981 | Howell | 361/124 |
| 4,308,566 | 12/1981 | Imataki et al. | 361/125 |
| 4,317,101 | 2/1982 | Ellis et al. | 338/21 |
| 4,321,649 | 3/1982 | Gilberts | 361/119 |
| 4,359,764 | 11/1982 | Block | 361/119 |
| 4,366,412 | 12/1982 | Lange et al. | 313/325 |
| 4,467,390 | 8/1984 | Carpenter, Jr. | 361/56 |
| 4,493,003 | 1/1985 | Mickelson et al. | 361/119 |
| 4,502,087 | 2/1985 | Huvet | 361/119 |
| 4,584,622 | 4/1986 | Crosby et al. | 361/56 |
| 4,628,394 | 12/1986 | Crosby et al. | 361/56 |
| 4,633,359 | 12/1986 | Mickelson et al. | 361/119 |
| 4,663,692 | 5/1987 | Carothers et al. | 361/117 |
| 4,734,823 | 3/1988 | Cunningham | 361/125 |
| 4,862,311 | 8/1989 | Rust et al. | 361/91 |

(List continued on next page.)

FOREIGN PATENT DOCUMENTS 2121642 8/1998 (CA) .............................. H01T/4/02

OTHER PUBLICATIONS

Joslyn Drawing No. 1061–1063, 1984.
Joslyn Drawing No. 82140, 1979.
"Surge Absorber"—Okaya Electric Industries Co., Ltd. Catalog–277–91, prior art.
"Advancing Electronic Technology"—Semitron, prior art.

*Primary Examiner*—Josie Ballato
*Assistant Examiner*—Miguel A. Quinones
(74) *Attorney, Agent, or Firm*—Marshall, Gerstein, & Borun

(57) ABSTRACT

A surge protector assembly may be provided with three terminals, a gas discharge tube having a first conductive end and a second conductive end opposite the first conductive end, a pair of metal oxide varistors conductively connected to the ends of the gas discharge tube, and a pair of bracket arms associated with the ends of the gas discharge tube. The bracket arms are movable between a steady-state position in which they cause the first and second terminals to be conductively separated from the third terminal and a shorting position in which they cause the first and second terminals to be conductively connected to the third terminal. The bracket arms are spaced from the ends of the gas discharge tube by a first distance when they are in their steady-state positions and by a second distance when they are in their shorting positions, with the first distance being greater than the second distance, and the bracket arms are spring-biased towards their shorting positions.

33 Claims, 6 Drawing Sheets

U.S. PATENT DOCUMENTS

| | | | | |
|---|---|---|---|---|
| 4,866,562 | | 9/1989 | Jones | 361/119 |
| 4,866,563 | | 9/1989 | Howard et al. | 361/124 |
| 4,876,713 | | 10/1989 | Crosby et al. | 379/412 |
| 4,903,295 | | 2/1990 | Shannon et al. | 379/437 |
| 4,910,632 | | 3/1990 | Shiga et al. | 361/127 |
| 4,912,592 | | 3/1990 | Flindall et al. | 361/120 |
| 4,944,003 | | 7/1990 | Meyerhoefer et al. | 379/412 |
| 4,984,125 | | 1/1991 | Uwano | 361/124 |
| 5,008,772 | | 4/1991 | Neuwirth et al. | 361/119 |
| 5,027,100 | | 6/1991 | Neuwirth et al. | 337/32 |
| 5,210,677 | * | 5/1993 | Smith | 361/119 |
| 5,224,012 | | 6/1993 | Smith | 361/119 |
| 5,224,013 | * | 6/1993 | Pagliuca | 361/119 |
| 5,278,720 | | 1/1994 | Bird | 361/119 |
| 5,282,109 | | 1/1994 | Smith | 361/119 |
| 5,313,183 | | 5/1994 | Kasahara | 337/32 |
| 5,384,679 | | 1/1995 | Smith | 361/119 |
| 5,388,023 | | 2/1995 | Boy et al. | 361/129 |
| 5,410,596 | | 4/1995 | Shannon et al. | 379/412 |
| 5,457,592 | * | 10/1995 | Smith | 361/119 |
| 5,490,032 | * | 2/1996 | Smith | 361/119 |
| 5,500,782 | | 3/1996 | Oertel et al. | 361/120 |
| 5,508,873 | | 4/1996 | Knapp et al. | 361/119 |
| 5,724,220 | * | 3/1998 | Chaundhry | 361/119 |
| 5,880,919 | | 3/1999 | Napiorkowski et al. | 361/117 |

* cited by examiner

MULTI-STAGE SURGE PROTECTOR WITH SWITCH-GRADE FAIL-SHORT MECHANISM

BACKGROUND OF THE INVENTION

The invention is directed to an electrical surge protection device of the type used to protect equipment and electrical circuits from being damaged by overvoltage surges and/or excessive surge currents.

Surge protection devices may be used to protect power lines, communication lines and electrical equipment connected to the power lines and communication lines from overvoltage surges, such as those caused by lightning or power cross conditions, for example. A power cross condition, which may occur as a result of a downed power line, consists of a high voltage and a high current at an alternating frequency, such as 60 Hz.

During an overvoltage surge, a surge protection device may provide temporary surge protection by shunting the overvoltage surge to ground. In the presence of a prolonged overvoltage condition, a surge protection device may also be designed to fail in a short-circuit state. Various embodiments of surge protectors are disclosed in U.S. Pat. No. 5,388,023 to Boy, et al., U.S. Pat. No. 5,500,782 to Oertel, et al., and U.S. Pat. No. 5,880,919 to Napiorkowski, et al.

SUMMARY OF THE INVENTION

The invention is directed to a surge protector assembly having three terminals, a gas discharge tube having a first conductive end and a second conductive end opposite the first conductive end, a first metal oxide varistor conductively connected to the first end of the gas discharge tube, and a first bracket arm associated with the first end of the gas discharge tube. The first bracket arm is movable between a steady-state position in which the first bracket arm causes the first terminal to be conductively separated from the third terminal and a shorting position in which the first bracket arm causes the first terminal to be conductively connected to the third terminal. The first bracket arm is spaced from the first end of the gas discharge tube by a first distance when the first bracket arm is in its steady-state position and by a second distance when the first bracket arm is in its shorting position, with the first distance being greater than the second distance, and the first bracket arm is spring-biased towards its shorting position.

The surge protector assembly includes a first holding member associated with the first bracket arm and a first portion of eutectic material, such as solder, that bonds the first bracket arm to the first holding member when the first bracket arm is in its steady-state position so that the first holding member holds the first bracket arm in its steady state position. The first bracket arm is released by the first holding member upon a change of state, such as melting, of the first portion of eutectic material so that the first bracket arm moves to its shorting position.

The surge protector assembly also includes a second metal oxide varistor conductively connected to the second end of the gas discharge tube and a second bracket arm associated with the second end of the gas discharge tube. The second bracket arm is movable between a steady-state position in which the second bracket arm causes the second terminal to be conductively separated from the third terminal and a shorting position in which the second bracket arm causes the second terminal to be conductively connected to the third terminal. The second bracket arm is spaced from the second end of the gas discharge tube by a third distance when the second bracket arm is in its steady-state position and by a fourth distance when the second bracket arm is in its shorting position, with the third distance being greater than the fourth distance, and the second bracket arm is spring-biased towards its shorting position.

The surge protector assembly further includes a second holding member associated with the second bracket arm and a second portion of eutectic material that bonds the second bracket arm to the second holding member when the second bracket arm is in its steady-state position so that the second holding member holds the second bracket arm in its steady state position, the second bracket arm being released by the second holding member upon a change of state of the second portion of eutectic material so that the second bracket arm moves to its shorting position.

Each of the bracket arms may have a hole formed therein, and a portion of each of the holding members may pass through one of the holes formed in the bracket arms. Each of the holding members may be provided with a relatively large-diameter portion and a relatively small-diameter portion, with the relatively small-diameter portion of each holding member passing through one of the holes in the bracket arms. The relatively large-diameter portion of each holding member may be bonded to one of the bracket arms by the eutectic material.

Each end of the gas discharge tube may have a hole formed therein, and each metal oxide varistors may be disposed in one of the holes formed in the ends of the gas discharge tube. The surge protector assembly may also include a pair of conductive mounting members that support the ends of the gas discharge tube, with each conductive mounting member having a first end connected to the first end of the gas discharge tube and a second end conductively connected to the first terminal, and the bracket arms may make physical contact with the conductive mounting members when the bracket arms are in their shorting positions. The surge protector assembly may also include a printed circuit board and a support structure that supports the gas discharge tube on the printed circuit board, and the surge protector assembly may be disposed within a housing and provided as a complete surge protector.

The features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
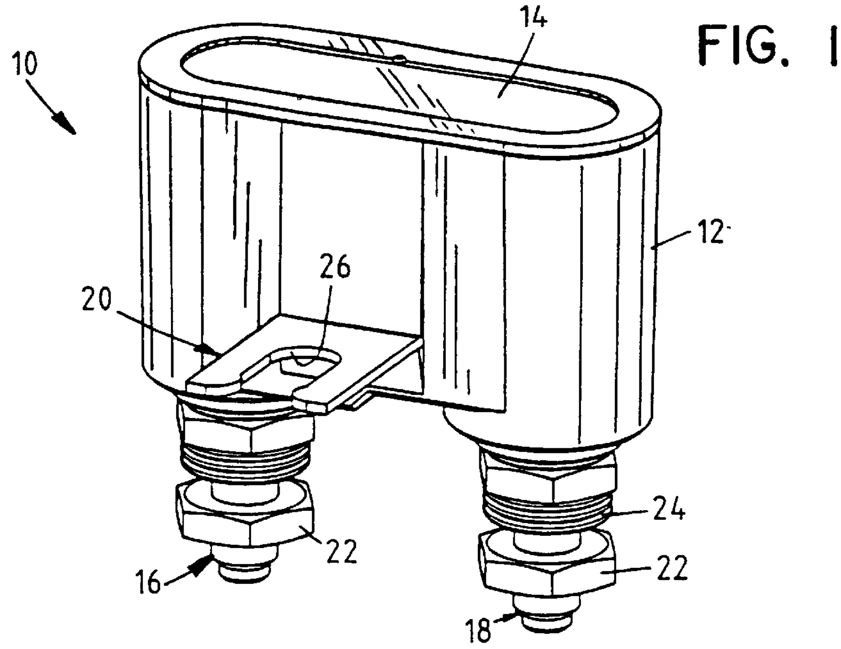
FIG. 1 is a perspective view of an embodiment of an electrical surge protector in accordance with the invention.

FIG. 1 illustrates one embodiment of a surge protector 10 in accordance with the invention. Referring to FIG. 1, the surge protector 10 has an insulating housing 12, which may be composed of plastic, a cover 14 which may be disposed on the housing 12, a pair of outer protector terminals 16, 18 which extend from the housing 12, and a center protector terminal 20 which extends from the housing 12. The outer protector terminals 16, 18 may be provided in the form of metal pins or screws, and each may be provided with one or more respective nuts 22 and washers 24 to facilitate fastening the terminals 16, 18 to conductors (not shown) for which surge protection is to be provided. The center terminal 20 may be provided in the form of a flat metal plate having an aperture 26 adapted to receive a bolt (not shown).

Figure 2:
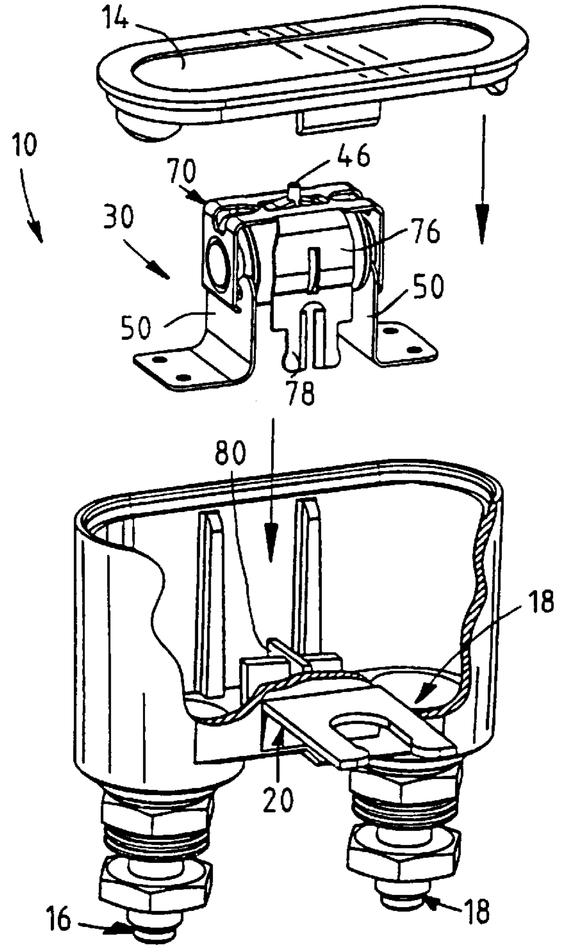
FIG. 2 is an exploded perspective view of the surge protector of FIG. 1.
Figure 3:
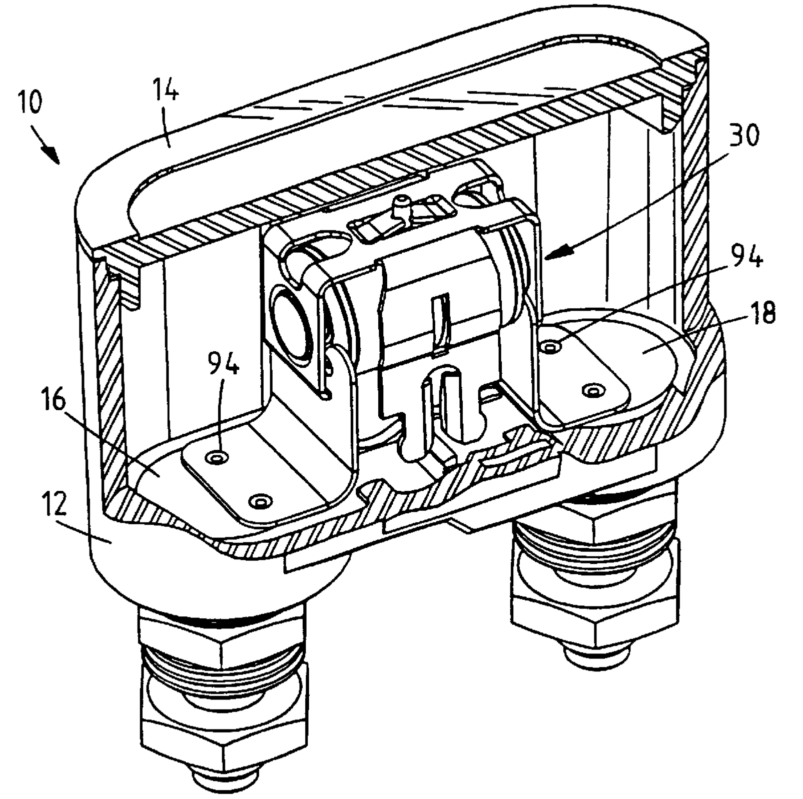
FIG. 3 is a perspective view of the surge protector of FIG. 1 with portions of the housing cut away.
Figure 4:
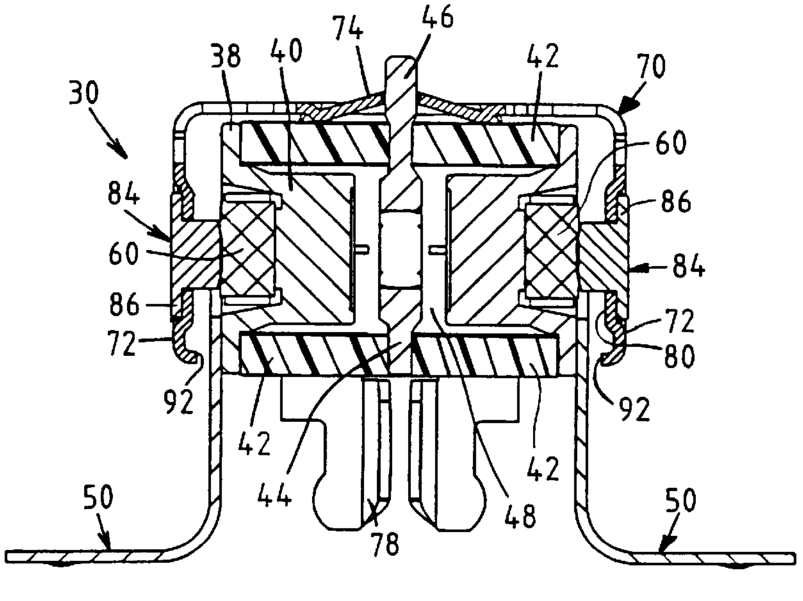
FIG. 4 is a cross-sectional view of a surge protector assembly shown in FIG. 1.
Figure 7:
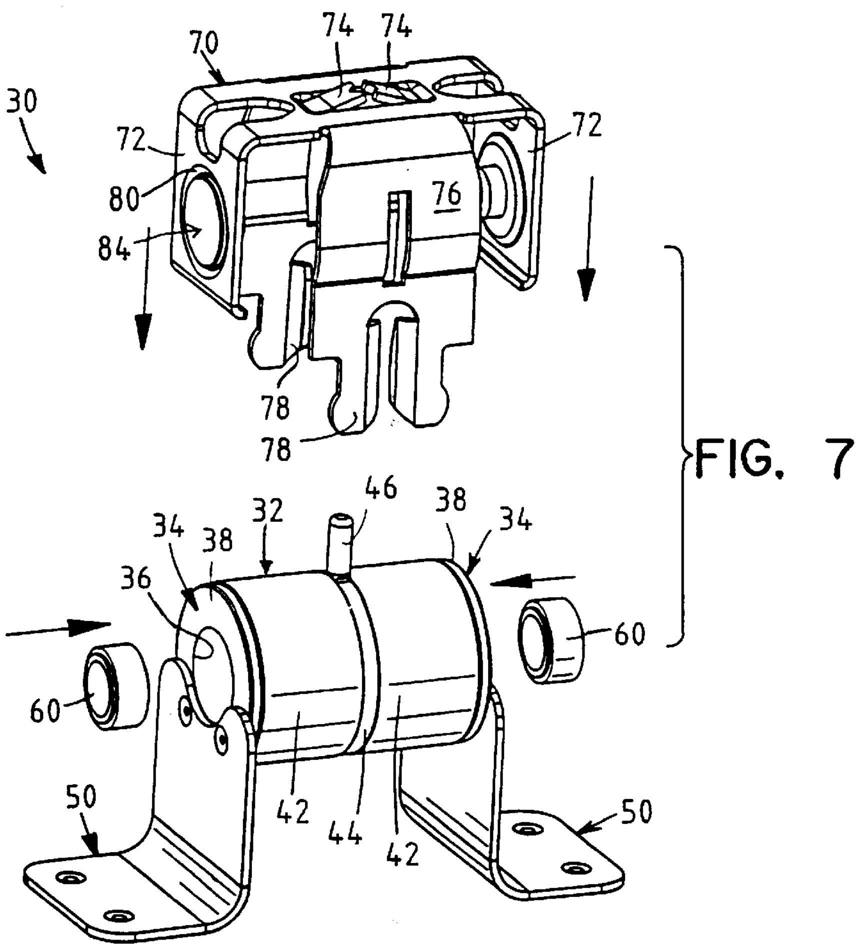
FIG. 7 is an exploded perspective view of the surge protector assembly of FIG. 1.

A surge protector module 30 is provided within the housing 12, as shown in FIGS. 2 and 3. Referring to FIG. 7, which is an exploded perspective view of the surge protector module 30, the module 30 incorporates a gas discharge tube 32 having a pair of end caps 34, each of which has a cylindrical hole 36 formed therein. Each of the end caps 34, which are composed of a conductive material such as metal, act as a gas discharge tube terminal. Referring also to FIG. 4, each end cap 34 of the gas discharge tube 32 is generally cup-shaped, having a relatively large-diameter portion 38 and a relatively small-diameter portion 40 in which the cylindrical hole 36 is disposed.

The gas discharge tube 32 has a pair of annular housing members 42, each of which is composed of a dielectric material. The annular housing members 42 are separated by a conductive ring member 44, which may be integrally formed with or otherwise connected to a conductive post, ring or pin 46 that may act as another terminal of the gas discharge tube 32. As shown in FIG. 4, a cavity 48 is disposed within the annular housing members 42, with a gas, such as Argon, disposed in the cavity 48 to provide the electrical characteristics of the gas discharge tube 32.

The gas discharge tube 32 as described above may be a conventional component that has been sold for a number of years prior to the filing date of this patent, such as a gas discharge tube as disclosed in U.S. Pat. No. 5,500,782 to Oertel, et al., which is incorporated by reference herein.

Figure 6:
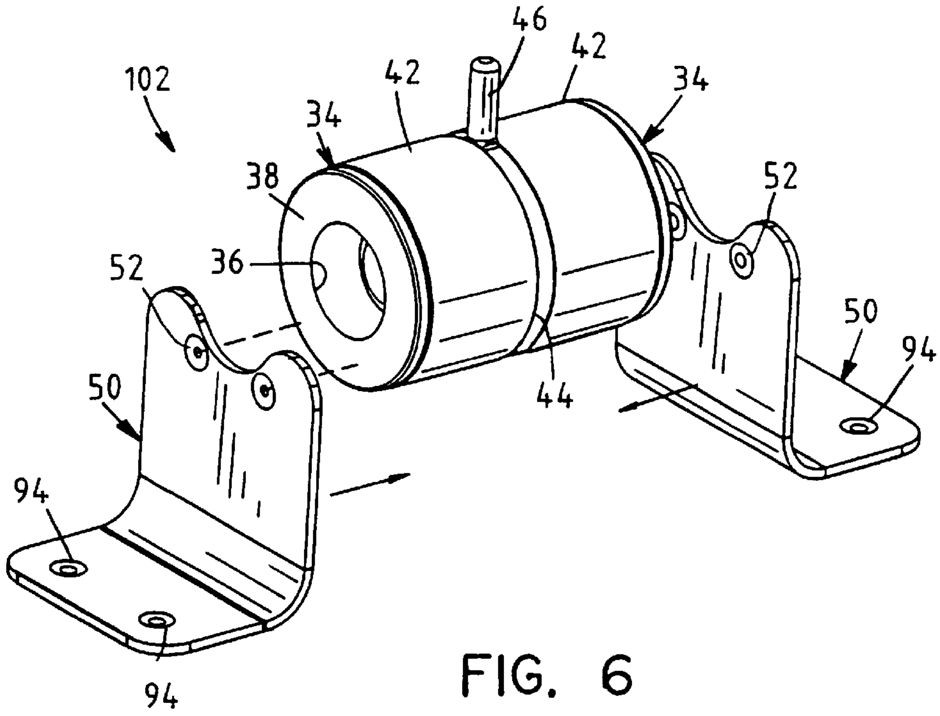
FIG. 6 is an exploded perspective view of a second portion of the surge protector assembly of FIG. 1.

Referring to FIGS. 6 and 7, a pair of conductive mounting members or brackets 50 may be connected to the gas discharge tube 32. Each of the mounting brackets 50, which may be L-shaped members, may be permanently connected to a respective one of the conductive end caps 34 of the gas discharge tube 32, via welding for example, at a number of welding points 52.

Referring to FIGS. 4 and 7, the surge protector assembly 30 includes a pair of surge protection elements in the form of metal oxide varistors 60. The metal oxide varistors 60 are sized to fit within the cylindrical holes 36 formed in the end caps 34 of the gas discharge tube 32 and are disposed within the cylindrical holes 36 after assembly of the surge protector assembly 30, as shown in FIG. 4.

Referring to the upper portion of FIG. 7, the surge protector assembly 30 includes a metal bracket 70 having a pair of bracket arms 72, each of which is vertically disposed and generally parallel to the vertical surfaces of the end caps 34 of the gas discharge tube 32. The bracket 70 has a pair of pinch members 74 integrally formed therewith, with the pinch members 74 being adapted to grip and make conductive connection with the conductive ring or pin 46 that acts as a center electrode of the gas discharge tube 32.

The bracket 70 has a pair of mounting arms 76 that extend downwardly from the upper portion of the bracket 70. A mounting clip 78 is formed on the lower portion of each of the mounting arms 76. Referring to FIG. 1, each of the mounting clips 78 may be sized or adapted to clip onto a conductive wall member 80 that extends upwardly from a bottom portion of the interior of the housing 12. The wall member 80 is conductively coupled to the center protector terminal 20 so that all portions of the conductive bracket 70 are conductively connected to the center protector terminal 20.

Figure 5:
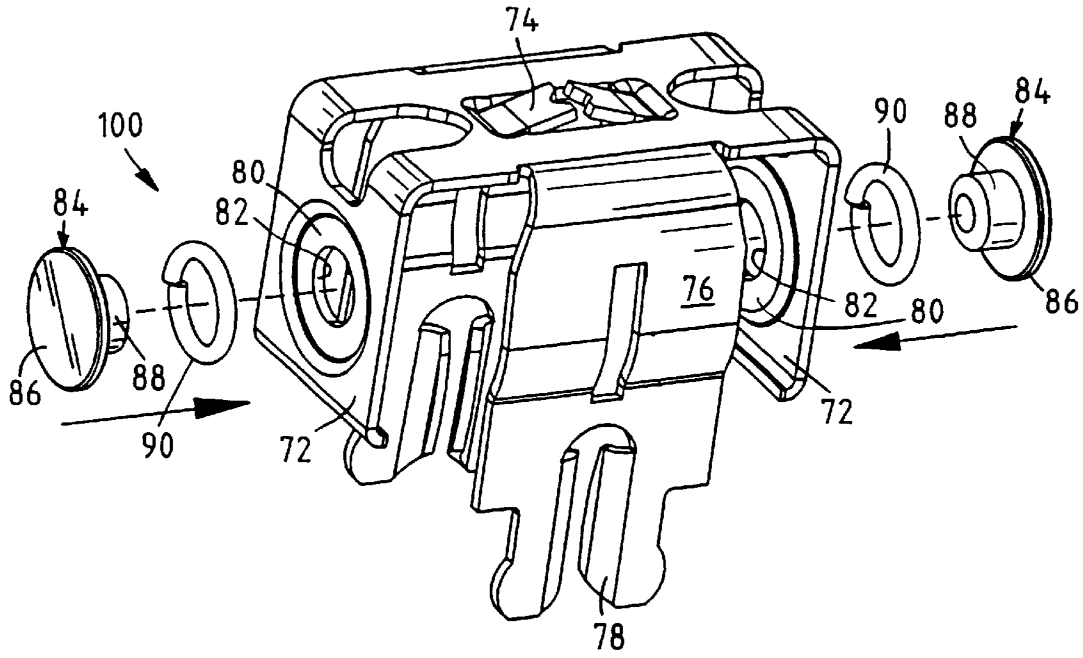
FIG. 5 is an exploded perspective view of a first portion of the surge protector assembly of FIG. 1.

Referring to FIGS. 4 and 5, each of the bracket arms 72 has a circular, inwardly recessed portion 80, with a circular hole 82 formed in its center. A respective holding member 84 is disposed through each of the holes 82. Each holding member 84 has a relatively large-diameter outer portion 86 and a relatively small-diameter inner portion 88. Each of the large-diameter outer portions 86 is sized so that it fits within one of the inwardly recessed portions 80 in the bracket arm 72.

Each of the holding members 84 is bonded to one of the bracket arms 72 with a eutectic material, such as solder. The eutectic material may be provided in the form of a solder disk, solder paste, or coil preform 90 having a diameter generally corresponding to the annular surface of the each of the inwardly recessed portions 80 of the bracket arms 72 and generally corresponding to the inner annular surface of each of the relatively large-diameter portion 86 of the holding members 84.

Referring to FIG. 4, the bracket 70 may act as a spring so that each of the bracket arms 72 is spring-biased inwardly. When the bracket arms 72 are bonded to the relatively large-diameter portions 86 of the holding members 84, the holding members 84 exert an outward force on the bracket arms 72 which prevents them from bending or moving inwardly.

The bonding between the holding members 84 and the bracket arms 72 provided by the eutectic material 90 is designed to fail in response to a change of state, such as melting, of the eutectic material 90. In that case, the inwardly biased bracket arms 72 move inwardly, under the influence of their spring bias, until a bottom edge 92 of each of the bracket arms 72 makes physical and conductive contact with the conductive brackets 50. As shown in FIG. 1, a portion of each of the outer protector terminals 16, 18 extends into the housing 12, and each of the conductive support brackets 50 may be connected to one of the outer protector terminals 16, 18 at a plurality of weld points 94.

Each of the metal oxide varistors 60 may be selected to provide a static or DC clamping voltage that is greater than the static or DC breakdown voltage of the gas discharge tube 32. For example, the gas discharge tube 32 may be selected to provide a DC breakdown voltage of 330 or 350 volts, and each of the metal oxide varistors 60 may be selected to provide a DC clamping voltage of 430 volts, for example.

Each of the metal oxide varistors 60 may have a size that is relatively small, such as about three millimeters in diameter, in order to provide the surge protector assembly 30 with a relatively low capacitance, such as a capacitance lower than about 30 picofarads or lower than about 20 picofarads, which would make the surge protector assembly 30 suitable for high-speed networks, such as DSL networks and existing telephone (POTS) networks, and which would provide the surge protector 10 with a very low insertion loss, such as 0.01 dB, depending on the frequency of the network.

Assembly

In order to assemble the surge protector assembly 30, the bracket assembly 100 shown in FIG. 5 may be completed by soldering the two holding members 84 to the bracket arms 72 with the eutectic material preforms 90. After soldering, the relatively large-diameter portion 86 of each holding member 84 will be bonded to one of the inwardly recessed portions 80 of each of the bracket arms 72 at an annular bonding area. The force required to physically break that bond may be selected to be a minimum force, or breakaway force, such as 60 pounds, so that jarring or other shock to the surge protector 10 will not unintentionally break the bond.

After forming the gas discharge tube assembly 102 shown in FIG. 6 by connecting the support brackets 50 to the end caps 34 of the gas discharge tube 32, the metal oxide varistors 60 may be placed within the holes 36 in the gas discharge tube 32, and then the completed bracket assembly 100 (after soldering as described above) may be placed over the gas discharge tube assembly 102 so that the holding members 84 press inwardly against the metal oxide varistors 60 to hold them in place, as shown in FIG. 4.

Referring to FIG. 2, after construction of the surge protector assembly 30, that assembly 30 may be installed within the housing 12 by placing the assembly 30 so that the clips 78 grip the conductive wall 80, forcing the assembly 30 downwards until the horizontal portions of the mounting brackets 50 make contact with the interior surfaces of the outer protector terminals 16, 18, and then welding the mounting brackets 50 to the terminals 16, 18 at the weld points 94. The cover 14 may then be connected to the housing 12, such as by ultrasonic welding. A moisture barrier (e.g. a non-conductive gel) may be included in the protector housing 12.

Operation

During operation, a voltage transient or a power surge may be induced in one or both of the electrical conductors (not shown) which are attached to the two protector terminals 16, 18. Some of the following operational examples refer to FIG. 9, which is a representation of an equivalent circuit of the surge protector assembly 30 of FIG. 1.

In the example described immediately below, it is assumed that: 1) a fast-rising voltage surge is induced so that a high voltage is present on the protector terminal 16 relative to the center protector terminal 20, which may be connected to a grounded conductor (not shown), 2) the surge has a rise time that is fast enough to increase the response time of the gas discharge tube 32, and 3) the gas discharge tube 32 is operable and not vented.

Figure 9:
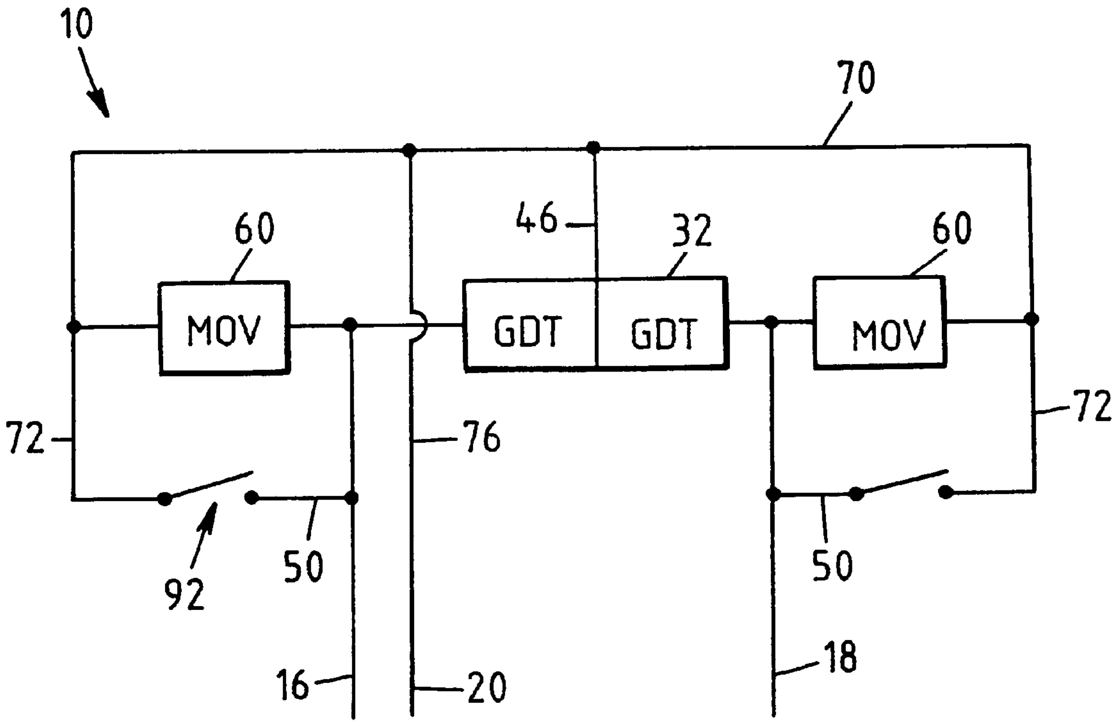
FIG. 9 is a representation of an equivalent circuit of the surge protector assembly of FIG. 1.
Figure 10:
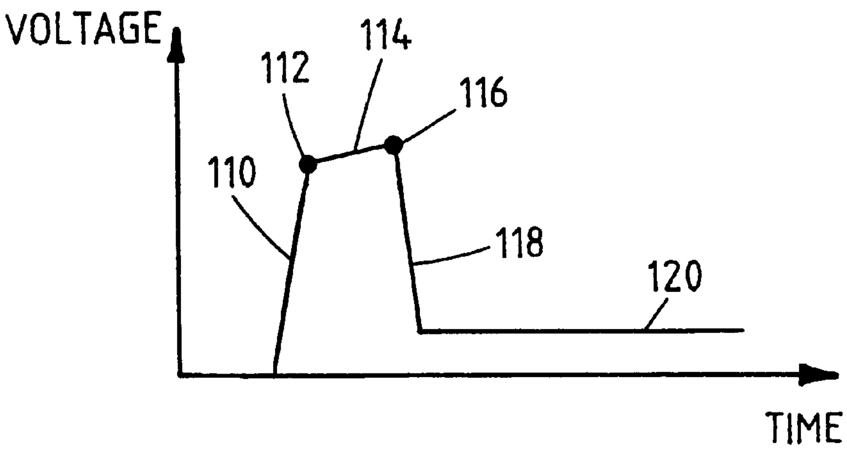
FIG. 10 is a graph of a waveform illustrating an example of the operation of the surge protector assembly.

In such case, there will be a fast-rising voltage transient indicated by the segment 110 shown in FIG. 10. The surge voltage will increase (relative to the voltage on the center terminal 20) until its magnitude reaches the clamping voltage of the metal oxide varistor 60 associated with the terminal 16 (the metal oxide varistor 60 shown in the left-hand portion of FIG. 9), as indicated at a point 112 shown in FIG. 10. At that point, surge current begins to flow through the metal oxide varistor 60, and the surge voltage stops increasing as fast, or alternatively may not increase at all, as shown in FIG. 10 by a segment 114.

When the voltage reaches the breakdown voltage of the gas discharge tube 32, as indicated in FIG. 10 by point 116, surge current begins to pass through the gas discharge tube 32 and the surge voltage decreases by the breakdown of the gas discharge tube 32, as indicated by a segment 118, to a relatively low magnitude, such as 15 volts, as indicated by a segment 120.

Referring to FIGS. 9 and 10, between points 112 and 116 shown in FIG. 10, surge current will pass from the terminal 16, through the left-hand metal oxide varistor 60, and to the center terminal 20 of the surge protector 10.

As shown in FIG. 9, the gas discharge tube 32 is in parallel with each of the metal oxide varistors 60. When the surge voltage reaches the breakdown voltage of the gas discharge tube 32 (i.e. at point 116), the impedance of the gas discharge tube 32 becomes significantly lower than that of left-hand metal oxide varistor 60, and consequently, the surge current flows through the gas discharge tube 32 beginning at point 116 in FIG. 10.

The time required for the gas discharge tube 32 to turn on (the length of time from the start of the surge voltage to the time when the gas discharge tube 32 turns on as indicated at point 116) is relatively short, such as several nanoseconds. Since that time is very short, the surge current that passes through the metal oxide varistor 60 will cause no damage to the varistor 60.

The operation described in the above example, and in particular the behavior of the surge protector 10 represented by the graph of FIG. 10, is the same as those of commercial embodiments of the surge protector disclosed in U.S. Pat. No. 5,500,782 to Oertel, et al., which commercial embodiments were sold in the United States prior to 1996.

If the rise time of the surge (i.e. represented by the slope of the segment 110 in FIG. 10) is slow enough to not affect the response time of the gas discharge tube 32, the gas discharge tube 32 will turn on and conduct surge current before the metal oxide varistor 60 turns on and conducts surge current because the DC breakdown voltage of the gas discharge tube 32 is lower than the DC clamping voltage of the metal oxide varistor 60, as noted above. In that case, no surge current will pass through the metal oxide varistor 60.

Figure 8:
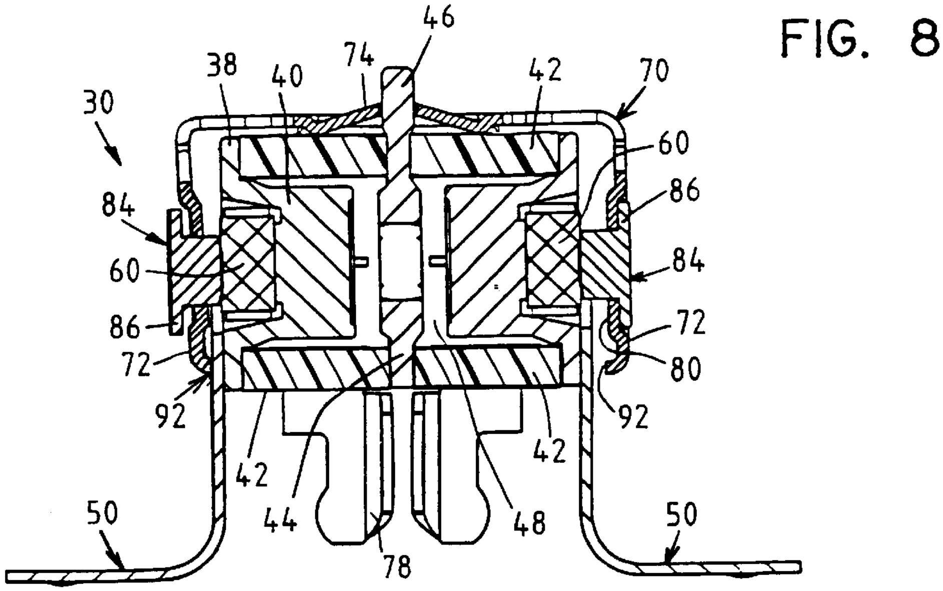
FIG. 8 is a cross-sectional view of the surge protector assembly shown in a shorted condition on one side.

In the presence of a prolonged power cross condition, where current passes through the surge protector 10 for a relatively long time, such as several seconds, the heat generated by the current will cause the eutectic material that bonds the bracket arm 72 to the holding member 84 to melt. Consequently, the bracket arm 72 will be released from the holding member 84 and will travel inwardly, due to its spring bias, until the bottom edge 92 of the bracket arm 72 makes contact with the conductive support member 50, as shown in the left-hand side of FIG. 8. The selective connection of the bottom edge 92 of the bracket arm 72 to the conductive member 50 is represented in FIG. 9 by the switch 92. When the bottom edge 92 of the bracket arm 72 makes contact with the conductive member 50, the protector terminal 16 is shorted to the grounded center terminal 20, which would be indicated in FIG. 9 with the closing of the switch 92, which is considered to be a switch-grade fail short.

The above examples assume that the gas discharge tube 32 is operable and is not vented. However, in some cases, the gas discharge tube 32 may become vented or inoperable, in which case a relatively large surge current would pass through the metal oxide varistor 60 for a relatively long period of time, such as several seconds for example (if the fail-short release mechanism described above were not provided in the surge protector assembly 30).

If the gas discharge tube 32 is inoperable, prior to the release of the bracket arm 72 by the holding member 84, which is caused by melting of the eutectic material, all surge current will pass through the metal oxide varistor 60. The inoperability or venting of the gas discharge tube 32 of the surge protector 10 does not cause a problem because of the very short time required for the bracket arm 72 to be released by the holding member 84, which may be less than one second. The release time may depend on the spring force generated by the bracket arms 72, the type of eutectic material used and its melting point, and the amount of eutectic material used to bond the bracket arms 72 to the holding members 84.

In some prior art surge protectors that incorporate fail-short mechanisms, a pellet or disk of fusible material having a relatively large volume of a conductive or insulating material is disposed between a spring-biased bracket arm to hold a conductive shorting member away from an intended shorting point. The inventors have realized that, in order for such a surge protector to short, the pellet or disk must completely melt before shorting can occur. If the pellet or disk melts only partially, leaving a portion of the disk or pellet intact, shorting may be delayed for a relatively long period of time or prevented altogether. A relatively long delay in shorting may allow undesirable external arcing of surge current to occur within the protector assembly for a relatively long period of time, damaging one or both of the spring-biased bracket arms and preventing the surge protector from shorting at any time, or creating a high resistive path which can cause a thermal "runaway" condition.

The above problem is not present with the embodiments disclosed herein due to the design of the fail-short release mechanism, which results in a relatively fast release time and acts as a thermal switch having a switch-grade fail short characteristic.

Alternative Embodiment

Figure 11:
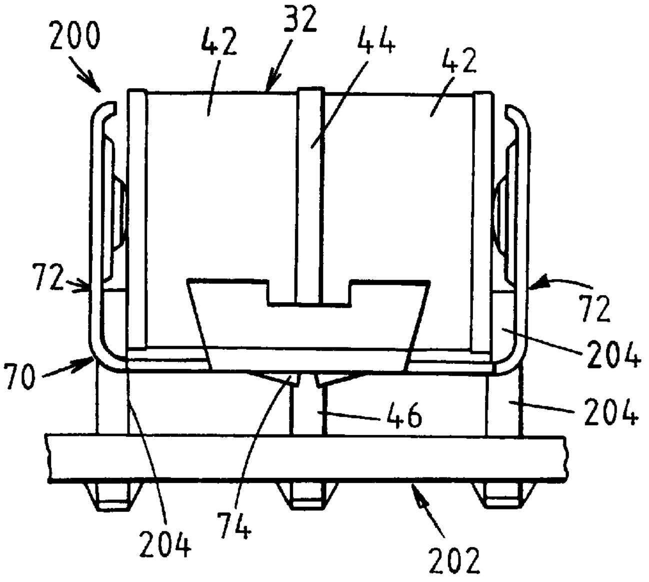
FIG. 11 is an alternative embodiment of a surge protector assembly in accordance with the invention.
Figure 12:
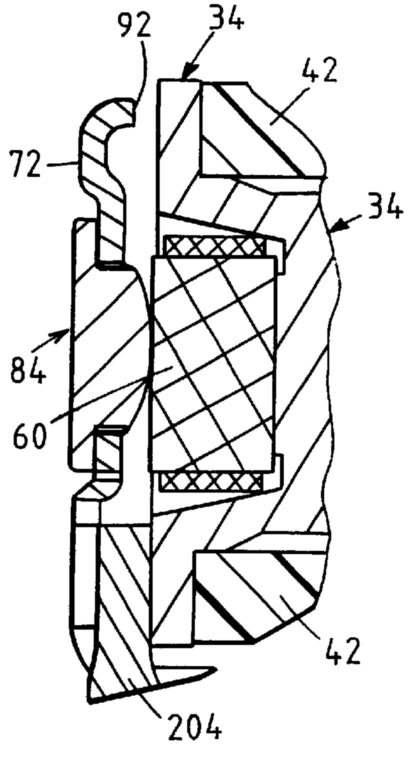
FIG. 12 is an enlarged cross-sectional side view of a portion of the surge protector assembly shown in FIG. 11.
Figure 13:
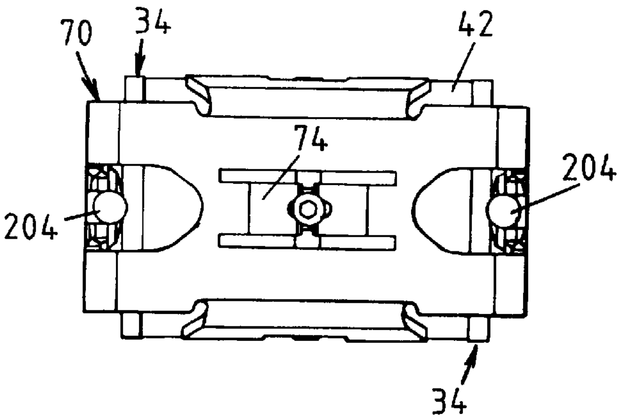
FIG. 13 is a bottom view of the surge protector assembly of FIG. 11 with the printed circuit board of FIG. 11 not shown.

An alternative embodiment of a surge protector assembly 200 is shown in FIGS. 11–13. The surge protector assembly 200 is generally similar to the surge protector assembly 30 described above, except that a bracket 70 of a different construction is used and the surge protector assembly 200 is connected to a printed circuit board 202. Also, instead of using the conductive support brackets 50 connected to the end caps 34 of the gas discharge tube 32, the surge protector assembly 200 utilizes rod-like conductors or wires 204, that act as electrical terminals, that are welded or otherwise conductively connected to the end caps 34.

In FIGS. 11–13, components that are similar, but not identical, in purpose and construction as corresponding components described in connection with FIGS. 2–8 are designated with the same reference numerals. The operation of the surge protector assembly 200 is substantially the same as that of the surge protector assembly 30 described above.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A surge protector assembly, comprising:

a first terminal;

a second terminal;

a third terminal;

a gas discharge tube having a first end and a second end;

a first metal oxide varistor conductively connected to said gas discharge tube;

a first bracket arm associated with said first end of said gas discharge tube, said first bracket arm being generally parallel to said first end of said gas discharge tube, said first bracket arm being movable between a steady-state position in which said first bracket arm causes said first terminal to be conductively separated from said third terminal and a shorting position in which said first bracket arm causes said first terminal to be conductively connected to said third terminal, said first bracket arm being spaced from said first end of said gas discharge tube by a first distance when sail first bracket arm is in its steady-state position and by a second distance when said first bracket arm is in its shorting position, said first distance being greater than said second distance, said first bracket arm being spring-biased towards its shorting position;

a first holding member associated with said first bracket arm;

a first portion of eutectic material that bonds said first bracket arm to said first holding member when said first bracket arm is in its steady-state position so that said first holding member holds said first bracket arm in its steady state position, said first bracket arm being released by said first holding member upon a change of state of said first portion of eutectic material so that said first bracket arm moves to its shorting position;

a second metal oxide varistor conductively connected to said gas discharge tube;

a second bracket arm associated with said second end of said gas discharge tube, said second bracket arm being generally parallel to said second end of said gas discharge tube, said second bracket arm being movable between a steady-state position in which said second bracket arm causes said second terminal to be conductively separated from said third terminal and a shorting position in which said second bracket arm causes said second terminal to be conductively connected to said third terminal, said second bracket arm being spaced from said second end of said gas discharge tube by a third distance when said second bracket arm is in its steady-state position and by a fourth distance when said second bracket arm is in its shorting position, said third distance being greater than said fourth distance, said second bracket arm being spring-biased towards its shorting position;

a second holding member associated with said second bracket arm; and a second portion of eutectic material that bonds said second bracket arm to said second holding member when said second bracket arm is in its steady-state position so that said second holding member holds said second bracket arm in its steady state position, said second bracket arm being released by said second holding member upon a change of state of said second portion of eutectic material so that said second bracket arm moves to its shorting position.

2. A surge protector assembly as defined in claim 1 wherein said first bracket arm has a hole formed therein and wherein a portion of said first holding member passes through said hole formed in said first bracket arm.

3. A surge protector assembly as defined in claim 1, wherein said first bracket arm has a hole formed therein, wherein said first holding member has a relatively large-diameter portion and a relatively small-diameter portion, wherein said relatively small-diameter portion passes through said hole in said first bracket arm, and wherein said relatively large-diameter portion is bonded to said first bracket arm by said first portion of eutectic material.

4. A surge protector assembly as defined in claim 1 wherein said first end of said gas discharge tube has a hole formed therein and wherein said first metal oxide varistor is disposed in said hole formed in said first end of said gas discharge tube.

5. A surge protector assembly as defined in claim 1 wherein said first holding member makes physical contact with said first metal oxide varistor when said first bracket arm is in its steady-state position and when said first bracket arm is in its shorting position.

6. A surge protector assembly as defined in claim 1 additionally comprising a printed circuit board and support structure that supports said gas discharge tube on said printed circuit board.

7. A surge protector assembly as defined in claim 6 wherein said support structure comprises three conductive members.

8. A surge protector assembly as defined in claim 1 wherein each of said metal oxide varistors has a size that causes said surge protector assembly to have a capacitance of less than about 30 picofarads.

9. A surge protector assembly as defined in claim 1 wherein each of said metal oxide varistors has a size that causes said surge protector assembly to have a capacitance of less than about 20 picofarads.

10. A surge protector assembly, comprising:

a first terminal;

a second terminal;

is a third terminal;

a gas discharge tube having a first end and a second end opposite said first end, said first and second ends of said gas discharge tube comprising a conductive material;

a first metal oxide varistor conductively connected to said first end of said gas discharge tube;

a first bracket arm associated with said first end of said gas discharge tube, said first bracket arm being movable between a steady-state position in which said first bracket arm causes said first terminal to be conductively separated from said third terminal and a shorting position in which said first bracket arm causes said first terminal to be conductively connected to said third terminal, said first bracket arm being spaced from said first end of said gas discharge tube by a first distance when said first bracket arm is in its steady-state position and by a second distance when said first bracket arm is in its shorting position, said first distance being greater than said second distance, said first bracket arm being spring-biased towards its shorting position;

a first holding member associated with said first bracket arm;

a first portion of eutectic material that bonds said first bracket arm to said first holding member when said first bracket arm is in its steady-state position so that said first holding member holds said first bracket arm in its steady state position, said first bracket arm being released by said first holding member upon a change of state of said first portion of eutectic material so that said first bracket arm moves to its shorting position;

a second metal oxide varistor conductively connected to said second end of said gas discharge tube;

a second bracket arm associated with said second end of said gas discharge tube, said second bracket arm being movable between a steady-state position in which said second bracket arm causes said second terminal to be conductively separated from said third terminal and a shorting position in which said second bracket arm causes said second terminal to be conductively connected to said third terminal, said second bracket arm being spaced from said second end of said gas discharge tube by a third distance when said second bracket arm is in its steady-state position and by a fourth distance when said second bracket arm is in its shorting position, said third distance being greater than said fourth distance, said second bracket arm being spring-biased towards its shorting position;

a second holding member associated with said second bracket arm; and a second portion of eutectic material that bonds said second bracket arm to said second holding member when said second bracket arm is in its steady-state position so that said second holding member holds said second bracket arm in its steady state position, said second bracket arm being released by said second holding member upon a change of state of said second portion of eutectic material so that said second bracket arm moves to its shorting position.

11. A surge protector assembly as defined in claim 10 wherein said first bracket arm has a hole formed therein and wherein a portion of said first holding member passes through said hole formed in said first bracket arm.

12. A surge protector assembly as defined in claim 10, wherein said first bracket arm has a hole formed therein, wherein said first holding member has a relatively large-diameter portion and a relatively small-diameter portion, wherein said relatively small-diameter portion passes through said hole in said first bracket arm, and wherein said relatively large-diameter portion is bonded to said first bracket arm by said first portion of eutectic material.

13. A surge protector assembly as defined in claim 10 wherein said first end of said gas discharge tube has a hole formed therein and wherein said first metal oxide varistor is disposed in said hole formed in said first end of said gas discharge tube.

14. A surge protector assembly as defined in claim 10 wherein said first holding member makes physical contact with said first metal oxide varistor when said first bracket arm is in its steady-state position and when said first bracket arm is in its shorting position.

15. A surge protector assembly as defined in claim 10 wherein said holding member releases said first bracket arm when said first portion of eutectic material melts.

16. A surge protector assembly as defined in claim 10 wherein said first portion of eutectic material comprises solder.

17. A surge protector assembly as defined in claim 10 additionally comprising a conductive mounting member that supports said first end of said gas discharge tube, said conductive mounting member having a first end connected to said first end of said gas discharge tube and a second end conductively connected to said first terminal, wherein said first bracket arm makes physical contact with said conductive mounting member when said first bracket arm is in its shorting position.

18. A surge protector assembly as defined in claim 10 wherein each of said first and second bracket arms is conductively connected to said third terminal.

19. A surge protector assembly as defined in claim 15 additionally comprising a printed circuit board and a support structure that supports said gas discharge tube on said printed circuit board.

20. A surge protector, comprising:

a housing;

a first protector terminal that extends from said housing, said first protector terminal comprising a conductive material;

a second protector terminal that extends from said housing, said second protector terminal comprising a conductive material;

a third protector terminal that extends from said housing, said third protector terminal comprising a conductive material;

a gas discharge tube having a first end and a second end;

a first metal oxide varistor conductively connected to said gas discharge tube;

a first bracket arm associated with said first end of said gas discharge tube, said first bracket arm being generally parallel to said first end of said gas discharge tube, said first bracket arm being movable between a steady-state position in which said first bracket arm causes said first protector terminal to be conductively separated from said third protector terminal and a shorting position in which said first bracket arm causes said first protector terminal to be conductively connected to said third protector terminal, said first bracket arm being spaced from said first end of said gas discharge tube by a first distance when said first bracket arm is in its steady-state position and by a second distance when said first bracket arm is in its shorting position, said first distance being greater than said second distance, said first bracket arm being spring-biased towards its shorting position;

a first holding member associated with said first bracket arm;

a first portion of eutectic material that bonds said first bracket arm to said first holding member when said first bracket arm is in its steady-state position so that said first holding member holds said first bracket arm in its steady state position, said first bracket arm being released by said first holding member upon a change of state of said first portion of eutectic material so that said first bracket arm moves to its shorting position;

a second metal oxide varistor conductively connected to said gas discharge tube;

a second bracket arm associated with said second end of said gas discharge tube, said second bracket arm being generally parallel to said second end of said gas discharge tube, said second bracket arm being movable between a steady-state position in which said second bracket arm causes said second protector terminal to be conductively separated from said third protector terminal and a shorting position in which said second bracket arm causes said second protector terminal to be conductively connected to said third protector terminal, said second bracket arm being spaced from said second end of said gas discharge tube by a third distance when said second bracket arm is in its steady-state position and by a fourth distance when said second bracket arm is in its shorting position, said third distance being greater than said fourth distance, said second bracket arm being spring-biased towards its shorting position;

a second holding member associated with said second bracket arm; and a second portion of eutectic material that bonds said second bracket arm to said second holding member when said second bracket arm is in its steady-state position so that said second holding member holds said second bracket arm in its steady state position, said second bracket arm being released by said second holding member upon a change of state of said second portion of eutectic material so that said second bracket arm moves to its shorting position.

21. A surge protector as defined in claim 20 wherein said first bracket arm has a hole formed therein and wherein a portion of said first holding member passes through said hole formed in said first bracket arm.

22. A surge protector as defined in claim 20, wherein said first bracket arm has a hole formed therein, wherein said first holding member has a relatively large-diameter portion and a relatively small-diameter portion, wherein said relatively small-diameter portion passes through said hole in said first bracket arm, and wherein said relatively large-diameter portion is bonded to said first bracket arm by said first portion of eutectic material.

23. A surge protector as defined in claim 20 wherein said first end of said gas discharge tube has a hole formed therein and wherein said first metal oxide varistor is disposed in said hole formed in said first end of said gas discharge tube.

24. A surge protector as defined in claim 20 wherein said first holding member makes physical contact with said first metal oxide varistor when said first bracket arm is in its steady-state position and when said first bracket arm is in its shorting position.

25. A surge protector, comprising:

a housing;

a first protector terminal that extends from said housing, said first protector terminal comprising a conductive material;

a second protector terminal that extends from said housing, said second protector terminal comprising a conductive material;

a third protector terminal that extends from said housing, said third protector terminal comprising a conductive material;

a gas discharge tube having a first end and a second end opposite said first end, said first and second ends of said gas discharge tube comprising a conductive material;

a first metal oxide varistor conductively connected to said first end of said gas discharge tube;

a first bracket arm associated with said first end of said gas discharge tube, said first bracket arm being movable between a steady-state position in which said first bracket arm causes said first protector terminal to be conductively separated from said third protector terminal and a shorting position in which said first bracket arm causes said first protector terminal to be conductively connected to said third protector terminal, said first bracket arm being spaced from said first end of said gas discharge tube by a first distance when said first bracket arm is in its steady-state position and by a second distance when said first bracket arm is in its shorting position, said first distance being greater than said second distance, said first bracket arm being spring-biased towards its shorting position;

a first holding member associated with said first bracket arm;

a first portion of eutectic material that bonds said first bracket arm to said first holding member when said first bracket arm is in its steady-state position so that said first holding member holds said first bracket arm in its steady state position, said first bracket arm being released by said first holding member upon a change of state of said first portion of eutectic material so that said first bracket arm moves to its shorting position;

a second metal oxide varistor conductively connected to said second end of said gas discharge tube;

a second bracket arm associated with said second end of said gas discharge tube, said second bracket arm being movable between a steady-state position in which said second bracket arm causes said second protector terminal to be conductively separated from said third protector terminal and a shorting position in which said second bracket arm causes said second protector terminal to be conductively connected to said third protector terminal, said second bracket arm being spaced from said second end of said gas discharge tube by a third distance when said second bracket arm is in its steady-state position and by a fourth distance when said second bracket arm is in its shorting position, said third distance being greater than said fourth distance, said second bracket arm being spring-biased towards its shorting position;

a second holding member associated with said second bracket arm; and a second portion of eutectic material that bonds said second bracket arm to said second holding member when said second bracket arm is in its steady-state position so that said second holding member holds said second bracket arm in its steady state position, said second bracket arm being released by said second holding member upon a change of state of said second portion of eutectic material so that said second bracket arm moves to its shorting position.

26. A surge protector as defined in claim 25 wherein said first bracket arm has a hole formed therein and wherein a portion of said first holding member passes through said hole formed in said first bracket arm.

27. A surge protector as defined in claim 25, wherein said first bracket arm has a hole formed therein, wherein said first holding member has a relatively large-diameter portion and a relatively small-diameter portion, wherein said relatively small-diameter portion passes through said hole in said first bracket arm, and wherein said relatively large-diameter portion is bonded to said first bracket arm by said first portion of eutectic material.

28. A surge protector as defined in claim 25 wherein said first end of said gas discharge tube has a hole formed therein and wherein said first metal oxide varistor is disposed in said hole formed in said first end of said gas discharge tube.

29. A surge protector as defined in claim 25 wherein said first holding member makes physical contact with said first metal oxide varistor when said first bracket arm is in its steady-state position and when said first bracket arm is in its shorting position.

30. A surge protector, comprising:

a housing;

a first protector terminal that extends from said housing, said first protector terminal comprising a conductive material;

a second protector terminal that extends from said housing, said second protector terminal comprising a conductive material;

a third protector terminal that extends from said housing, said third protector terminal comprising a conductive material;

a gas discharge tube having a first discharge tube terminal, a second discharge tube terminal, and a third discharge tube terminal, said gas discharge tube having a DC breakdown voltage, said gas discharge tube having a first end with an opening disposed therein and a second end with an opening disposed therein, said first end being opposite said second end, said first and second ends of said gas discharge tube comprising a conductive material;

a first metal oxide varistor disposed in said opening in said first end of said gas discharge tube, said first metal oxide varistor making contact with said first end of said gas discharge tube so that said first metal oxide varistor is conductively connected to said gas discharge tube, said first metal oxide varistor having a DC clamping voltage that is higher than said DC breakdown voltage of said gas discharge tube;

a first bracket arm associated with said first end of said gas discharge tube, said first bracket arm being movable between a steady-state position in which said first bracket arm causes said first protector terminal to be conductively separated from said third protector terminal and a shorting position in which said first bracket arm causes said first protector terminal to be conductively connected to said third protector terminal, said first bracket arm being spaced from said first end of said gas discharge tube by a first distance when said first bracket arm is in its steady-state position and by a second distance when said first bracket arm is in its shorting position, said first distance being greater than said second distance, said first bracket arm being spring-biased towards its shorting position;

a first holding member associated with said first bracket arm;

a first portion of eutectic material that bonds said first bracket arm to said first holding member when said first bracket arm is in its steady-state position so that said first holding member holds said first bracket arm in its steady state position, said first bracket arm being released by said first holding member upon a change of state of said first portion of eutectic material so that said first bracket arm moves to its shorting position;

a second metal oxide varistor disposed in said opening in said second end of said gas discharge tube, said second metal oxide varistor making contact with said second end of said gas discharge tube so that said second metal oxide varistor is conductively connected to said gas discharge tube, said second metal oxide varistor having a DC clamping voltage that is higher than said DC breakdown voltage of said gas discharge tube;

a second bracket arm associated with said second end of said gas discharge tube, said second bracket arm being movable between a steady-state position in which said second bracket arm causes said second protector terminal to be conductively separated from said third protector terminal and a shorting position in which said second bracket arm causes said second protector terminal to be conductively connected to said third protector terminal, said second bracket arm being spaced from said second end of said gas discharge tube by a third distance when said second bracket arm is in its steady-state position and by a fourth distance when said second bracket arm is in its shorting position, said third distance being greater than said fourth distance, said second bracket arm being spring-biased towards its shorting position;

a second holding member associated with said second bracket arm; and a second portion of eutectic material that bonds said second bracket arm to said second holding member when said second bracket arm is in its steady-state position so that said second holding member holds said second bracket arm in its steady state position, said second bracket arm being released by said second holding member upon a change of state of said second portion of eutectic material so that said second bracket arm moves to its shorting position.

31. A surge protector as defined in claim 30 wherein said first bracket arm has a hole formed therein and wherein a portion of said first holding member passes through said hole formed in said first bracket arm.

32. A surge protector as defined in claim 30, wherein said first bracket arm has a hole formed therein, wherein said first holding member has a relatively large-diameter portion and a relatively small-diameter portion, wherein said relatively small-diameter portion passes through said hole in said first bracket arm, and wherein said relatively large-diameter portion is bonded to said first bracket arm by said first portion of eutectic material.

33. A surge protector as defined in claim 30 wherein said first holding member makes physical contact with said first metal oxide varistor when said first bracket arm is in its steady-state position and when said first bracket arm is in its shorting position.

* * * * *